April 18, 1944.　　T. A. BOWERS　　2,346,896
PISTON RING
Filed March 17, 1941
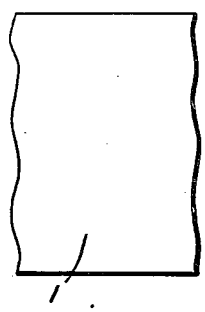
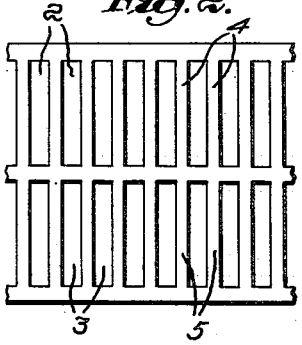
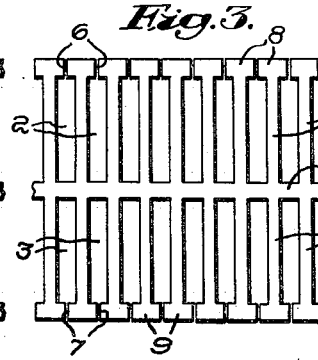
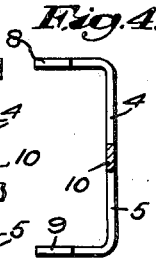
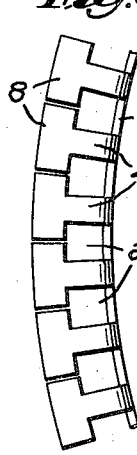
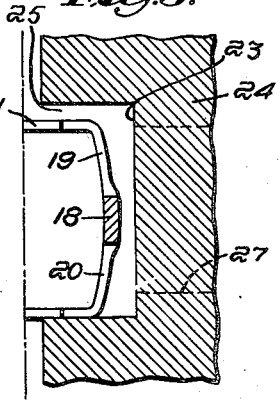
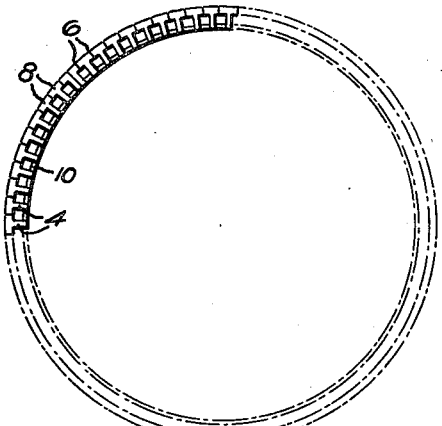
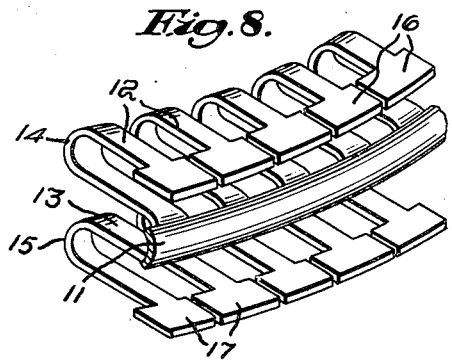
Inventor:
Thomas A. Bowers
by
Attorney Patented Apr. 18, 1944

2,346,896

UNITED STATES PATENT OFFICE 2,346,896

PISTON RING

Thomas A. Bowers, Mattapoisett, Mass., assignor to Power Research Corporation, Boston, Mass., a corporation of Massachusetts Application March 17, 1941, Serial No. 383,706

2 Claims. (Cl. 309—45)

This invention relates to piston rings and more especially to piston rings of the oil metering type.

The principal object of the invention is to improve piston rings and to devise unitary ring structures having incorporated therein spaced-apart circumferential edges for metering oil. It is a further object of the invention to provide ring structures of novel flexible and extensible character which are cheap, efficient, and durable, and which reduce loss of oil by carbonization. Still another object is to provide a piston ring having a multiplicity of oil scraping edge portions and supporting elements which are independently movable radially and circumferentially with respect to one another.

The nature of the invention and its objects will be more fully understood from the following description of the drawing and discussion relating thereto.

In the accompanying drawing:

Fig. 1 is a fragmentary plan view of a sheet material employed in making piston rings in accordance with the invention;

Fig. 2 is a fragmentary plan view illustrating a step in the manufacture of a ring of the invention;

Fig. 3 is a fragmentary plan view illustrating a further step in the treatment of the sheet metal;

Fig. 4 is a view in partial cross section and elevation illustrating still another forming operation resulting in a finished ring;

Fig. 5 is a fragmentary perspective view of the finished ring of the invention;

Fig. 6 is an enlarged fragmentary plan view of the piston ring;

Fig. 7 is a plan view of a complete ring;

Fig. 8 is a fragmentary perspective view of a modified piston ring of the invention; and Fig. 9 is a partial cross section and elevational view of a piston groove and another modified ring construction.

In the construction shown, numeral 1 denotes a strip of sheet material employed in making the rings of the invention. The sheet material is of a resilient nature and may, for example, be made of a spring steel, or alloy, or other metal or suitable substance.

In accordance with a preferred embodiment of the invention, the strip 1 is punched to provide openings 2 and 3 extending transversely within its edges and forming web portions 4 and 5. The strip is further cut at its edges with openings or slits 6 and 7, to produce T-shaped segments 8 and 9. It will be noted that the cuts 6 and 7 connect with the openings 2 and 3, separating the segments 8 and 9 and their respective web portions from one another, and leaving the webs 4 and 5 joined at opposite sides of a continuous central body portion 10.

The formed material is folded, longitudinally of the strip, to provide a member of U shape, or other open formation, in which the segments 8 of one edge of the strip are spaced from the segments 9 of the other edge of the strip, and the two rows of segments occur one above another in substantially parallel relation, as illustrated in Fig. 4. This provides a straight length of material which may be formed into an annular body as illustrated in Figs. 5 and 6. Thereafter a length of the material suitable for effecting a desired size of piston ring is provided and various finishing operations, such as hardening, grinding, and the like, may be resorted to, to provide the completed ring as shown in Fig. 7.

The steps of punching, cutting, folding, or otherwise forming the sheet material, may be carried out by apparatus of the type commonly referred to as "tool machinery," such as punch press mechanism, cutting or shearing dies, press or rolling mechanism, or the like.

In the folded position of the cut sheet material, the parallelly disposed rows of segments constitute flat sealing surfaces or land surfaces by means of which the ring may seat against a side of a piston groove. The rows of segments are supported by means of the webs which, together with the central body portion 10, may constitute an inner peripheral wall of the ring. The segments extend radially outward from the inner peripheral wall to present spaced-apart oil metering edges constituting the outer periphery of the ring.

The openings 6 and 7 extend in a direction radially of the ring and provide for the segments being spaced apart minute amounts. These openings 6 and 7, while allowing the segments to be moved slightly toward one another, in a circumferential direction, are too small to permit passage of oil therethrough. They may also be arranged to occur so that the openings of one row of segments are offset or staggered with respect to openings of the other row of segments. The openings 2 and 3 provide passageways for oil to pass through the ring into the crankcase, and the edges of the webs 4 and 5, which define the passageways, resist deposite of carbon by reason of their thinness.

The ring structure is characterized by very desirable flexibility. The segments may be circumferentially compressed upon one another, tending to close the openings as 6 and 7. The resilient character of the piston ring material allows the webs to flex or twist as the segments approach one another, and thereafter to spring back into their normal position. There is thus obtained in the compacted position of the ring a uniform expansibility particularly adapted to engaging the edges of the ring with a cylinder wall and to resiliently maintaining the ring in engagement with the wall as its diameter changes, as for example in the case of a "tapered" cylinder.

The ring structure is further characterized by resiliency, resulting from the arrangement of the web portions on the central body portion. Each of the segments and a respective web portion may be flexed in a direction radially of the ring, independently of the other segments and their respective web portions. This allows portions of one of the ring edges to become out-of-round and to more readily adhere to an irregular cylinder wall independently of other portions of the ring edge. Also, either of the edges is free to move independently of the other edge, which may also be advantageous in some instances.

In addition to the circumferential and radial flexibility noted, the ring is axially flexible since the circumferential edges may be compressed toward one another. Such axial resiliency may be utilized to engage the ring in a piston groove for prevention of slapping of the ring in its groove, and for achieving other purposes such as holding the ring in a sealed position at both sides of its groove at all points in the stroke of the piston in a cylinder.

In operation, the ring functions as a gapless ring with its ends adapted to abut one another, and a ring is employed of normal diameter slightly greater than the diameter of the cylinder in which it is installed so that the ring constantly exerts a pressure outwardly. This pressure forces the ring to engage the wall of a cylinder at all points, conforming to any non-uniformity or worn areas therein, and exerting a substantially uniform pressure at all points therealong.

An important function of the oil ring is to remove excess oil from the cylinder just prior to contact by combustion gases during the power stroke of the piston. This prevents carbonization of excess amounts of oil and thus reduces oil consumption. As the piston moves downwardly of the cylinder, both of the rows of segments scrape oil from the cylinder wall. One of the rows of segments becomes tightly seated against the side of the piston groove which pushes the ring downwardly, and this provides a seal at the point of seating. The radial openings in the seated row of segments retain films of oil which are effective in preventing passage of oil between the segments. Therefore, oil collected by the seated row of segments cannot escape through it, or between the seated row and the piston groove, back on to the cylinder wall. Such oil is passed through the openings 2 and 3 of the inner peripheral wall of the ring and thence through openings as 27 in the piston connecting with the crankcase. Oil scraped by the other row of segments passes radially inward of the piston groove over the row and then to the openings 27.

While the particular forming steps illustrated have been shown in connection with a length or strip of sheet material, it is intended that such operations may be effected upon various other materials, occurring as in a sheet form, or in a web, or as a roll. The material itself may vary in cross section to present relatively thinner and thicker portions at various points therein. The sequence of cutting and forming may be reversed or otherwise changed, and the size and form of the openings modified as by forming openings diagonally or angularly of a strip of material, or in other ways. In addition, it may be desired to provide a ring structure of the general character noted by bringing together, piece by piece, ring-forming portions which are completely severed from one another and securing these portions on some suitable type of separate annular supporting structure.

In Fig. 8 a modified piston ring construction has been illustrated, consisting of a substantially continuous inflexible body portion 11, having web portions 12 and 13 joined at opposite sides therewith, and being bent over upon themselves to form bends 14 and 15, which constitute the inner periphery of the ring. The webs 12 support segments 16, which constitute one oil scraping edge of the ring extending radially beyond the continuous central body portion 11. The webs 13 similarly support segments 17, which constitute another oil scraping edge also extending beyond the continuous central body portion 11.

In this ring construction, the oil scraping edge made up of the contiguously arranged segments 16 is axially movable with respect to the oil scraping edge made up of the contiguously arranged segments 17. The doubled over form of the webs 12 and 13 provides increased length which renders these elements more adapted to being twisted or distorted in a direction circumferentially of the ring, thereby developing a substantial flexibility in a ring having an inflexible body portion. Also, it should be observed that flexibility of the character noted is obtained with openings which extend from a generally central point in the ring body to its edges and with the openings at one edge being completely separated from the openings of the other edge.

In Fig. 9 I have illustrated a further modified type of piston ring having a continuous central body portion 18, formed of webs 19 and 20 and crowns 21 and 22. In this modification of ring, the central body portion is arranged in an inwardly and radially projecting position, such that when installed in a piston groove 25, it is adapted to bear against the inner side 23 of a piston groove 24. Such an arrangement may be utilized in some instances to absorb piston slap and prevent excess wear at some one point or area in a cylinder wall. Various other modifications may be desired to be resorted to.

In each of the constructions shown, it will be observed that a substantially continuous central body portion is preserved, which develops individual resiliency of each segment in the respective rows where they occur. This provides a novel type of yieldability and expansibility which is effective at any one desired point in a ring periphery without necessarily modifying the circumference of the rest of the ring.

Various advantages are present in connection with the piston rings shown. There is provided a one-piece ring which is convenient to handle and quickly and easily assembled in a piston groove. The ring is provided with novel compressible and extensible character, rendering it particularly adaptable for use with worn or irregular cylinder surfaces. The oil scraping edges are of a thin character, closely simulating the character of thin separate C-type rings heretofore resorted to for oil metering in pistons. The entire structure is adapted to be formed of tough thin materials such as steels and alloys, of which only relatively small amounts are required. This provides a light, durable and cheap ring. In addition, the use of materials of the character indicated and the construction noted lend themselves to cheap manufacturing processes which can be carried out with conventional forming machinery such as punches, dies, presses and the like, thereby tending to further cheapen the cost of such rings.

The ring is further desirable in respect to furnishing efficient wall pressure. By the construction shown, almost any desired wall pressure may be arrived at without reducing the uniformly extensible character of the ring, and in addition, it is possible to provide an improved and increased range of expansibility at any point in which range the wall pressure of the ring is satisfactorily operative. The ring is further characterized by very efficient oil metering, long operating life, and substantial reduction of cylinder wear.

While I have shown a preferred embodiment of my invention, it should be understood that various changes and modifications may be resorted to, in keeping with the spirit of the invention as defined by the appended claims.

Having described my invention, I claim:

1. A piston ring comprising spaced-apart sides which include contiguously arranged segments, a central body portion, spaced-apart webs for connecting the segments to the central body portion, said webs extending from the central body portion in a direction radially inward of the ring, then axially of the ring and then radially outward of the ring.

2. A piston ring comprising spaced-apart sides including a plurality of contiguously arranged segments, an inflexible body portion extending circumferentially of the ring intermediate the sides, spaced-apart webs connecting the segments at opposite sides of the body portion, said webs being doubled over and extending from the body portion in a direction radially inward of the ring, then axially of the ring, and then radially outward of the ring, said doubled over web construction being effective in imparting circumferential resilience to the spaced-apart webs.

THOMAS A. BOWERS.